Patented Sept. 12, 1922.

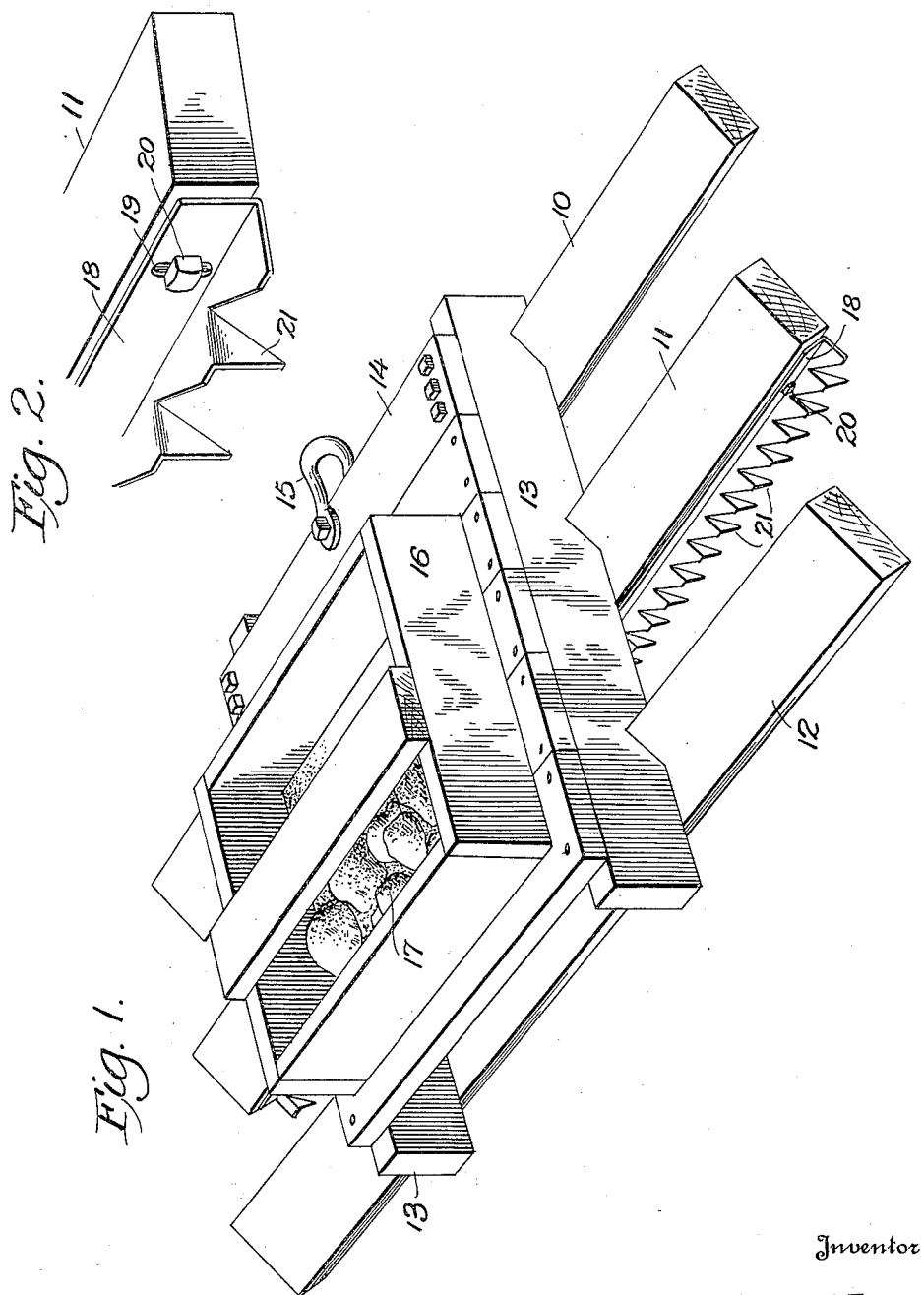

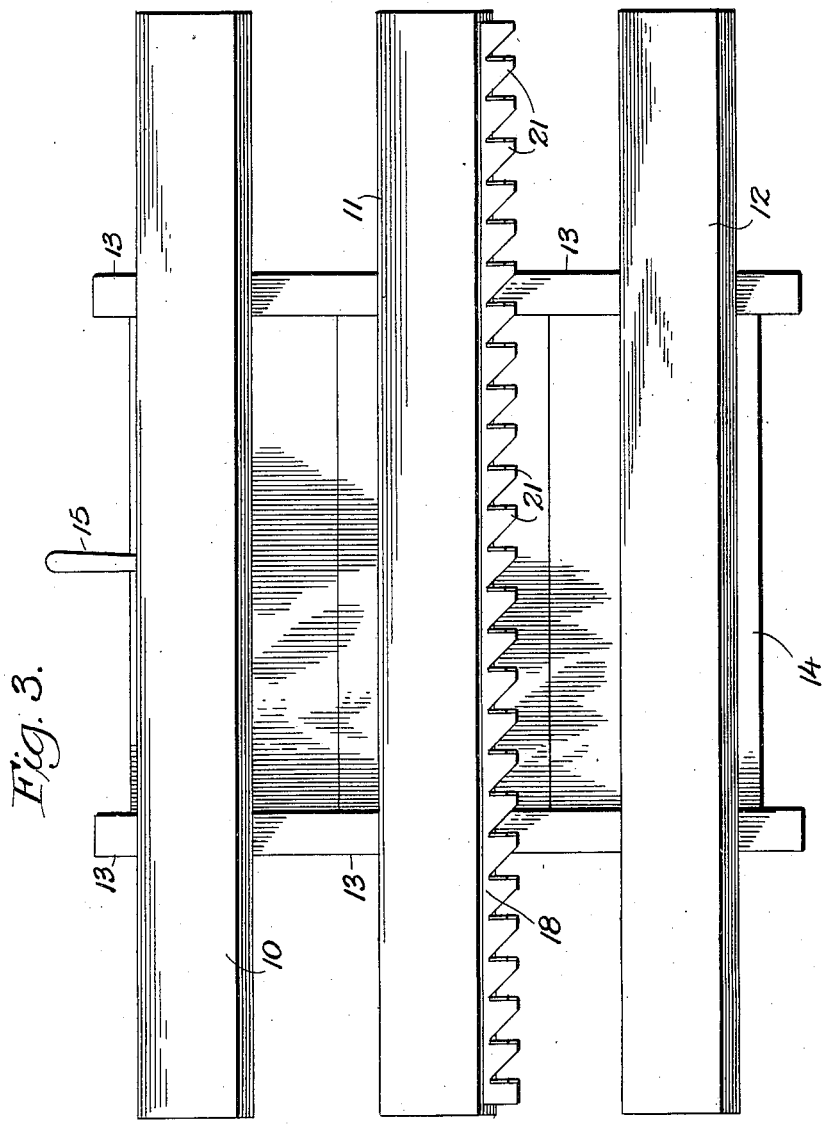

UNITED STATES PATENT OFFICE.

BENYEW H. DE MOTT, OF MILLINGTON, NEW JERSEY.

SOIL-WORKING IMPLEMENT.

Application filed May 27, 1921. Serial No. 472,980.

*To all whom it may concern:*

Be it known that I, BENYEW H. DE MOTT, a citizen of the United States of America, residing at Millington, in the county of Morris and State of New Jersey, have invented certain new and useful Improvements in Soil-Working Implements, of which the following is a specification.

My present invention relates generally to soil working implements, and more particularly to an implement in the nature of a soil levelling and scarifying device, my object being the provision of means adaptable for adjustable mounting in connection with a levelling drag, soil pulverizer, planker, or logger as it is commonly known in different localities, to increase the amount of work done in a given time, economize in labor and power, and increase the quality of the work.

It is well known that a drag is one of the best known means of levelling and in fitting fields for crops, although in its use it becomes necessary to go through separate harrowing operations after plowing in order that the lumps of soil may be turned up for the drag to pulverize, and in order that the air pockets at the bottom of plow furrows may be thoroughly worked out. My invention seeks to avoid the necessity of separate harrowing operations and permit a field to be completely fitted by the use of a drag alone for subsequent seeding operations, the field being levelled, the soil pulverized, and the ground worked to a sufficient depth to insure the elimination of air pockets and properly prepare it for the reception of seeds.

With these objects my invention consists in the construction and arrangement applied to field drags as shown in the accompanying drawing wherein, Figure 1 is a perspective view of a complete drag equipped with my improvements, Figure 2 is a detail perspective view of a portion of one of the drag beams to which my improvements are attached, Figure 3 is a bottom plan view.

Referring now to these figures I have shown in Figure 1 a common form of field drag used for levelling and soil pulverizing purposes, which includes a series of transverse soil engaging beams 10, 11 and 12 secured to the lower edges of a pair of spaced parallel lengthwise disposed sleepers 13 the latter in turn supporting from their upper edges the ends of the planks forming the platform 14 to the central forward portion of which any suitable draft attaching member 15 may be connected.

The platform 14 may support an upwardly opening box 16 which, when the drag is tractor drawn, contains rock or other ballast shown at 17. Where the drag is horse drawn it is most common for the driver to stand or be seated on the platform and thus constitute the necessary ballast.

While it is not essential I have shown the soil engaging beams in a series of three and when this arrangement is carried out it is preferred that my soil attachment be applied to the central beam 11, the attachment being in the nature of an angle bar 18 whose vertical portion has transversely elongated slots 19 in which lag bolts or other connecting members 20 are adjustable, permitting the bar 18 to be raised and lowered.

The lag bolts or connecting members 20 enter the rear face of the beam, the other or approximately horizontal portion of bar 18 having a lengthwise series of inclined slits and having its portions at one side of the said slits downturned to form a lengthwise series of ground entering teeth 21, disposed edgewise in the direction of movement of the drag and gradually increasing in depth from their front to their rear edges the latter of which terminate flush with the rear edge of the bar.

For the above purpose the slits of the bar providing for the downward bending of integral portions thereof extend inwardly of the bar from its rear free edge, and the result is a transverse series of scarifying teeth below the plane of the soil engaging beams, 10, 11 and 12 and at right angles thereto.

By the particular means utilized in the formation of the teeth 21 it is possible to duplicate the teeth in considerable number along the length of the bar, and while shown upon the rear face of the central beam of the series, it is obvious the bar 18 may be utilized along the forward portion of any particular beam of the series.

With the attachment as provided for by my invention the drag can be used to accomplish in one or two operations what now requires from three to five operations including the ordinary drag and a harrow, and as the several teeth 21 must in practice go the full depth into the soil there is every assurance of an even tilling operation and a thorough working in addition to the effective turning up of lumps for the pulverizing action of the beams.

My improvements also provide an economical soil working machine which avoids the necessity of a separate harrow and while being in the nature of a drag will be and is most commonly made by the user except as to the attachment which may be readily applied and adjusted in place.

I claim:

1. A soil working implement in the nature of a levelling drag having soil engaging beams, and an angle bar having one portion secured vertically along one of said beams and having its other horizontal portion provided with a lengthwise series of inclined slits extending inwardly from its free edge and with downturned triangular extensions adjacent to said slits disposed at right angles to the said horizontal portion of the bar, forming soil entering teeth projecting below the beams.

2. A soil working implement in the nature of a levelling drag having soil engaging beams, and an angle bar secured to one of said beams, one portion of which bar has a lengthwise series of slits extending inwardly from and acutely inclined with respect to its free edge and has downturned triangular extensions adjacent to said slits, forming soil entering teeth projecting below the beams at right angles to the bar and parallel to the line of movement of the implement in use, the other portion of said bar having transversely elongated slots, and fastening means adjustable in said slots to permit of raising and lowering the bar as described.

In testimony whereof I have affixed my signature.

BENYEW H. DE MOTT.